United States Patent [19]
Kumar

[11] Patent Number: 5,247,679
[45] Date of Patent: Sep. 21, 1993

[54] METHOD FOR SEQUENTIALLY REGISTERING EXECUTABLE PROGRAM FORMATS WITH UNRESOLVED POINTERS BY ASSIGNING LINKAGE STATE AND INVOCATION STATE THEREOF

[75] Inventor: Arun Kumar, Ashland, Mass.

[73] Assignee: Prime Computer, Inc., Natick, Mass.

[21] Appl. No.: 483,097

[22] Filed: Feb. 20, 1990

[51] Int. Cl.$^5$ .................................... G06F 9/445
[52] U.S. Cl. .................... 395/700; 364/DIG. 1;
364/280.2; 364/280.4
[58] Field of Search ............... 364/DIG. 1, DIG. 2;
395/400, 700, 600

[56] References Cited
U.S. PATENT DOCUMENTS

| | | | |
|---|---|---|---|
| 4,330,822 | 5/1982 | Dodson | 395/600 |
| 4,503,492 | 3/1985 | Pilat | 395/400 |
| 4,833,604 | 5/1989 | Cheng et al. | 395/700 |
| 4,868,745 | 9/1989 | Patton et al. | 395/400 |
| 5,093,916 | 3/1992 | Karp et al. | 395/700 |

Primary Examiner—Thomas C. Lee
Assistant Examiner—John C. Loomis
Attorney, Agent, or Firm—Wolf, Greenfield & Sacks

[57] ABSTRACT

A method and apparatus for linking and registering executable program formats (EPFs) so as to resolve all unresolved pointers. The invention sequentially attempts to link and initialize each EPF by resolving the unresolved pointers of each EPF. During each attempt to initialize an EPF, the EPF is assigned two states, a linkage state and an invocation state. If an EPF has all pointers to shared address space resolved, it is marked as INITIALIZED. Otherwise, it is marked as UNINITIALIZED. Further, an EPF is marked as SUSPENDED if it contains either unresolved pointers or pointers that reference another EPF that is marked as SUSPENDED. Otherwise, the EPF is marked as READY and is ready to execute. Data defining the unresolved pointers of each EPF that is not SUSPENDED is stored in a database. After each EPF is registered, the database is checked to determine if all the unresolved pointers in the shared linkage of a suspended EPF can now be resolved. If so, those EPFs are reinitialized, marked as INITIALIZED and READY and the data pertaining to them is removed from the database. In this manner, the EPFs can be registered and initialized in any order.

5 Claims, 3 Drawing Sheets

METHOD FOR SEQUENTIALLY REGISTERING EXECUTABLE PROGRAM FORMATS WITH UNRESOLVED POINTERS BY ASSIGNING LINKAGE STATE AND INVOCATION STATE THEREOF

FIELD OF THE INVENTION

The invention pertains to the linking of executable program formats (EPFs). More particularly, the invention pertains to facilitating the sharing of code by registering the status of the EPFs during initialization.

BACKGROUND DISCUSSION

The user of a computer typically writes an applications program in a mid or high level language such as Basic, Fortran, Pascal, etc. Before the program can be executed, however, several steps must be performed by the computer to transfer the program into a form which can be executed by the computer. First, a compiler program translates the high level language into machine code. After compilation, the program is then linked by a linkage editor program. The linkage editor creates, from the compiled program, a module of binary code which can be loaded into contiguous memory space in the computer memory. This module of binary code is called an executable module and can be executed by the computer. An Executable Program Format (EPF) is an example of an executable module. The linkage editor may form a single module of code (in binary form) which either can be executed by the CPU without reference to memory locations outside of the EPF module or form a module with external references to subroutines or common memory areas and specifically define, in terms of symbolic addresses, the external references. In other words, an EPF is a program that has been compiled and linked and, therefore, is capable of being run in the processor. An EPF comprises the binary code of the program including commands to the operating system which contain information as to where data should be kept. The EPF also comprises data segments which hold the data needed during the execution of the program.

Computer program instruction flow normally proceeds from one instruction to the next sequential instruction in memory address space. However, programs typically include some instructions which disrupt the normal flow and require jumps in the program routine to remote addresses in order to obtain the next instruction to be executed. The remote address may be within the same EPF or may be external to the EPF. A common example of such a jump is a call to a subroutine which requires the program counter to jump to a remote address to continue the instruction flow. In order to accommodate for these jumps in programming sequence, a pointer is provided in the instruction sequence at the point where the jump is initiated. In a compiled and linked program, i.e., in an EPF, a pointer typically comprises (1) an instruction indicating that the program must invoke the remote procedure and (2) the starting address of the remote procedure. Before linkage, however, external pointers do not comprise a specific memory location but rather are defined as a symbolic address. This situation exists before linkage since external pointer addresses cannot be defined until the program is loaded into memory. All instructions, including the instructions that are at the destination of a pointer have no specific addresses in memory until the program is loaded into memory. An external pointer that does not comprise a specific address in memory is referred to as an unresolved pointer.

Therefore, when a program is loaded into memory, the linkage editor program tries to resolve all the pointers to external objects so that the program will be executable. As noted above, however, external pointers in an EPF may point to symbolic addresses that are external to the EPF. These external pointers typically are to shared memory space, i.e., memory that can be accessed by the EPFs of all users of the computer system. Examples of the types of program segments that are the subject of external pointers are standard sub-routines or other program segments that are provided in a library in memory as part of the computer system.

At the time of loading, the location of the library containing the program is unknown. When the program is run, and an external pointer containing the symbolic address is encountered, the libraries will be searched to find the entry point (i.e. the address of the first instruction of the program) defined by the external pointer. Every EPF which contains an external pointer pointing to the same location also will perform, at run time, the same search for the entry point in order to resolve the external pointer. Since external pointers in an EPF are stored in private memory, the fact that an EPF of another user has already resolved the external pointer does not relieve EPFs of other users from also performing the same search for the identical entry point. The fact that EPFs must perform numerous redundant searches at run time significantly reduces the performance of a computer system.

An improvement over the ordinary linking of EPFs is the registered EPF. In an ordinary EPF, all data is stored within the EPF, which is comprised entirely of private memory. Memory that is private cannot be seen except by a single user. Systems that use registered EPFs allow for certain data to be private and other data to be shared. The term shared means that the data is placed in a location in memory that can be accessed by all users. Some linkages to external pointers are stored in private memory while others are stored in shared memory. As part of the design of the system, decisions are made as to which linkages are private and which are shared.

When the computer system is brought up, the operating system tries to register the EPFs. At this registration time, the operating system of the computer initializes the EPFs. Initialization includes, among other steps unrelated to the present invention, resolving the internal pointers, and storing the run time image of the EPFs in shared memory. It also attempts to resolve the external pointers. Since registered EFPs are stored in shared memory, if a later registered EPF needs to find an entry point in an EPF that had been registered earlier, to resolve an external pointer in its sequence, it can see the first EPF and resolve the external pointer.

The registered EPF system, however, has several shortcomings. First, in the prior art registered EPF system described above, all external references must be resolved at registration time. Another problem with the prior art registration scheme is the fact that, in order for an EPF to be registered, the EPF must resolve all its pointers at registration time. In order to be able to resolve all its pointers, particularly its external pointers, an EPF cannot reference another EPF that has not yet been registered. This leads to two substantial limitations. First, the EPFs must be registered in a very specific order dictated by the dependency of the EPFs upon each other, that is, the first EPF to be registered cannot contain an external pointer to another EPF. The second EPF to be registered can only refer to the first EPF which previously has been registered (or to no EPF at all). The third EPF to be registered can refer only to the first two EPFs and so on down the line. Further, it is absolutely forbidden for there to be cyclic references amongst the EPFs. For instance, if a first EPF referred to a second EPF, the second EPF could not refer to the first EPF. This would cause a situation where the first EPF could not be registered before the second EPF, but by the same token the second EPF could not be registered before the first EPF. In effect, resolved pointers can be only to shared memory or to other EPFs that have previously been registered.

As the number of EPFs increases, keeping track of the EPF dependency tree becomes extremely complicated and burdensome since the number of permutations increases exponentially.

Furthermore, if a previously registered EPF is unregistered and then again registered, all other EPFs that directly or indirectly call this EPF must also be unregistered and then again registered.

Therefore, it is an object of a present invention to provide an improved registered EPF system.

It is a further object of the present invention to provide a registered EPF system wherein EPF linkages can be resolved in any order.

It is another object of the present invention to provide a registered EPF system having increased performance.

It is another object of the present invention to simplify use of a computer system, and to allow sophisticated users greater performance options.

SUMMARY OF THE INVENTION

The invention comprises a method and apparatus for linking and registering executable program formats (EPFs) so as to resolve all unresolved external pointers. The invention allows EPFs to be registered in any order. The invention sequentially attempts to register each EPF by resolving all unresolved external pointers (i.e., pointers to shared memory or external procedures) of that EPF. After each attempted registration of an EPF, the EPF is assigned two separate states, a linkage state and an invocation state. An EPF which has had all pointers to shared address space resolved is assigned a linkage state of INITIALIZED. Otherwise, it is assigned a linkage state of UNINITIALIZED. Further, an EPF is assigned an invocation state of SUSPENDED if it either contains unresolved external pointers in its shared linkage or pointers that directly or indirectly reference another EPF that is marked as UNINITIALIZED. Otherwise, the invocation state is marked as READY and the EPF is ready to be executed. In addition, a section of memory is reserved for a database containing information concerning the external pointers o suspended EPFs. For each EPF that is marked as SUSPENDED during the registration procedure, data defining the unresolved pointers of that EPF is stored in the database and is identified as pertaining to that particular EPF.

Every time an additional EPF is registered, the database is checked and all unresolved pointers which can now be resolved due to the preceding registration of the additional EPF are resolved. Additionally, linkage states and/or invocation states are updated at this time, if necessary.

In a preferred embodiment, the user can input a list of EPFs upon which any particular EPF depends and the programming will only attempt to reinitialize that particular EPF when it has determined that all of those EPFs have been registered.

DETAILED DESCRIPTION OF THE INVENTION

Figure 1:
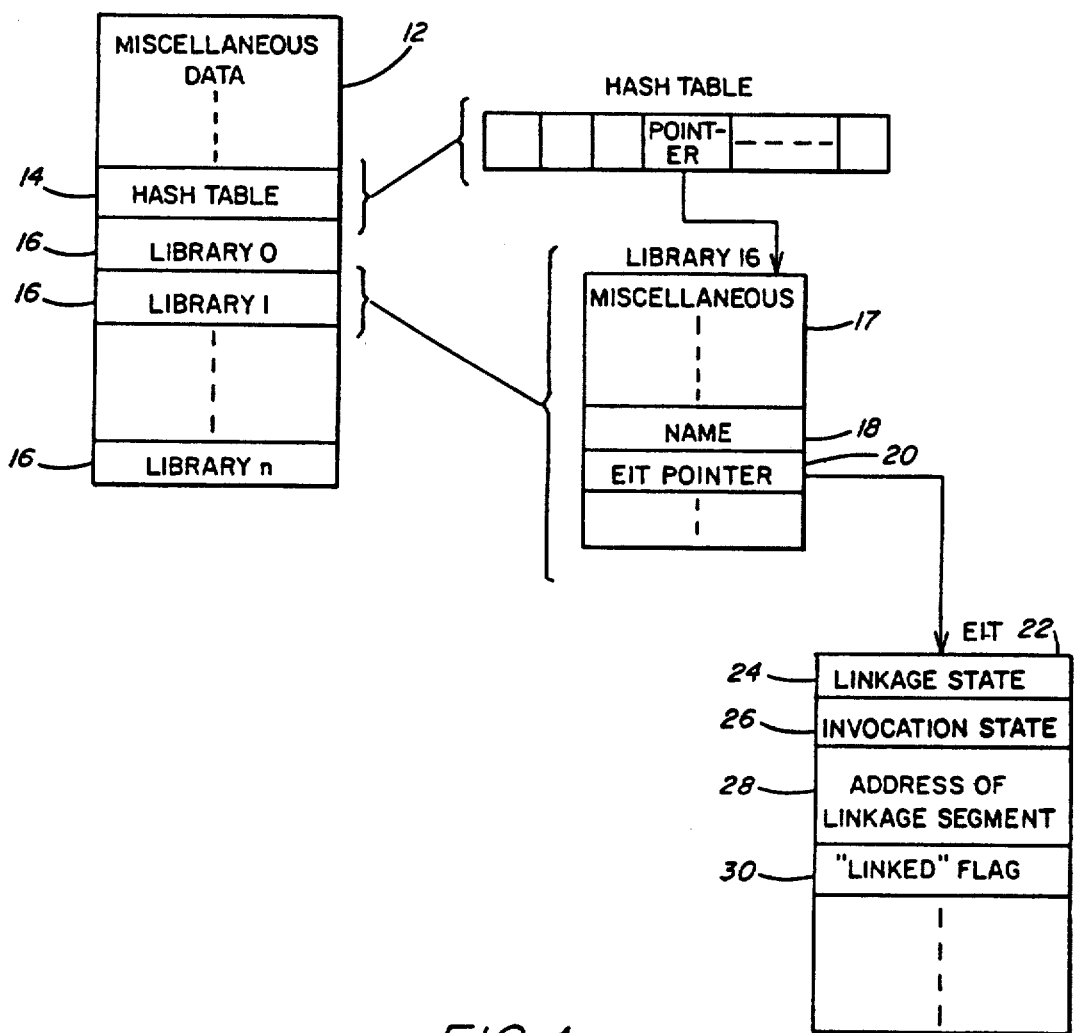
FIG. 1 is a block representation of the composition of the registered database of the present invention.

The present invention comprises a registered EPF system. It is essentially a software program which can be implemented in the operating system of a computer system. The computer system will comprise both shared memory and private memory for individual users.

Like the prior art registered EPF systems, the present invention normally registers all EPFs at system power up, though EPFs can be registered any time after the system is up and running. Also as in the prior art, certain linkages are private while others are shared. The present invention only attempts to resolve linkages in shared memory, i.e. external pointers present in shared linkages, at registration time. Private, external references are resolved at run time. All external linkages are listed in a linkage segment external to the EPF. A jump instruction points to the appropriate address in the appropriate linkage segment. The linkage segment stores information pertaining to various external pointers in addition to other information which is not relevant to the present invention. At first, the linkage segment contains a series of unresolved pointers at specified addresses therein. If and when the external pointers are resolved, the specific addresses of the pointers will be substituted for the external pointer stored in the linkage segment. Typically, a linkage segment will store information on a plurality of external references. An EPF may require one or more linkage segments depending on the number of external references contained in the EPF and other variables.

During registration, each EPF is assigned a linkage state and an invocation state. The linkage state of an EPF may comprise one of two states, INITIALIZED and UNINITIALIZED. If the addresses of all of the shared linkages are resolved, the EPF is assigned a linkage state of INITIALIZED. If there are any shared linkages that are not resolved, the EPF is marked as UNINITIALIZED.

The invocation state of an EPF may be either READY or SUSPENDED. An EPF is marked as READY if all its linkages are resolved and all external registered EPFs that it invokes directly or indirectly are marked as INITIALIZED. Otherwise it is marked as SUSPENDED. An EPF may be marked SUSPENDED due to one or both of the following two conditions. First, some of the pointers simply may not be resolved. Thus, an UNINITIALIZED EPF is always assigned an invocation state of SUSPENDED. Second, one or more of the EPFs that are invoked, directly or indirectly, by this EPF are marked as UNINITIALIZED or have not yet been registered.

At registration time, the present invention first attempts to initialize each EPF in the same manner as was done in the prior art, except (1) no particular order of EPF registration is necessary, and (2) linkages are resolved as described herein. The program attempts to resolve all external pointers and assign linkage and invocation states for the EPF. The linkage state and invocation state of each EPF is stored in a database in memory.

An EPF on which no attempt to register has yet been made will be referred to as an unregistered EPF. By contrast, an EPF on which an attempt has been made to register (i.e., the steps discussed above have been performed) is a registered EPF. As a subset of registered EPFs, an EPF which is INITIALIZED and READY hereinafter will be referred to as a READY EPF. An EPF which has been registered but is not READY will be referred to as an assigned EPF since it has been assigned a linkage and an invocation state. Therefore, assigned EPFs and READY EPFs collectively comprise registered EPFs.

Each time a new EPF is registered (i.e., (1) the EPF is initialized, (2) as many external pointers as possible are resolved, and 3) the EPF is assigned a linkage state and an invocation state), an attempt is made to resolve the linkages of all previously registered EPFs which are marked as SUSPENDED UNINITIALIZED. If the linkage states of a given EPF and that of all other EPFs that it directly or indirectly refers to are INITIALIZED, then the invocation state of that EPF is changed to READY and the EPF becomes a READY EPF. The EPF can then be executed. In this manner, EPFs can be registered in any order and cyclic references are allowed.

For example, if EPF A is the first EPF to be registered and it contains a reference to EPF B, then EPF A will be marked as UNINITIALIZED since, at a minimum, the pointer to EPF B cannot be resolved. Therefore, EPF A is also marked as SUSPENDED. At some later time, the system will attempt to register EPF B. Assuming that EPF B has a reference to EPF A, EPF B will be marked as SUSPENDED since EPF A is UNINITIALIZED. EPF B may or may not be marked as INITIALIZED depending on the resolution of its other pointers. The pointer to EPF A, however, will be resolved since EPF A is registered at this time and its entry point is known. Of course, other pointers may remain unresolved causing EPF B to be marked as UNINITIALIZED. For this example, it will be assumed that EPF B has no unresolved pointers and references no other EPFs except EPF A. Therefore, EPF B is marked as INITIALIZED and SUSPENDED. At this time, the system program will search the database for all EPFs that are SUSPENDED and UNINITIALIZED. When the program comes across an EPF such as EPF A, which is SUSPENDED and UNINITIALIZED, it will check what pointer or pointers are unresolved. It will note that a reference to EPF B is unresolved. Since EPF B is now registered, the system program will resolve this linkage to EPF B. Assuming that this was the only unresolved linkage in EPF A, EPF A will now be marked as INITIALIZED. After checking all UNINITIALIZED EPFs, the system program will now perform a second search for additional EPFs that are marked as INITIALIZED and SUSPENDED and will eventually come upon EPF B, which it had just registered as INITIALIZED and SUSPENDED. The program will further note that EPF A is now INITIALIZED and that EPF B, which is indirectly referenced by EPF B through EPF A is also INITIALIZED. Therefore the program will mark EPF B as READY (assuming it referenced no other suspended EPFs). Note that the system program will also encounter EPF A in the second search since, during the first search, it was updated to INITIALIZED and SUSPENDED. Thus, EPF A will also be updated to READY since, according to the example, it only referenced EPF B which is also INITIALIZED.

A registered EPF can also be unregistered under certain circumstances which should be obvious to a person skilled in the relevant arts. If an EPF becomes unregistered, then the present invention will change the invocation state to SUSPENDED of all other EPFs which directly or indirectly reference the now unregistered EPF and which were previously marked as READY.

It is also possible that an EPF which is already registered can be registered again. This is referred to hereinafter as re-registration. When an EPF is re-registered, two copies of that EPF will then exist in the system. The previous users of that EPF, those which were registered before that EPF was re-registered, continue to access the old copy of that EPF. The new users access the new copy of the re-registered EPF. Alternately, if it is desired that all users of a re-registered EPF refer to the new copy then the first registered copy of the EPF can be unregistered through an unregister instruction before being registered the second time.

As an additional feature, the program of the present invention can be designed such that it will attempt to change the linkage and invocation status of a registered EPF only when all other EPFs that are referred to by that EPF are registered. This can be implemented by allowing the user to store in memory for each EPF, a dependency table of the EPFs which are referenced by it. The program can then check this table against the database table listing the current INVOCATION status of all EPFs and attempt to reinitialize an EPF only if all EPFs upon which the current EPF depends are registered.

A further advantage of the present invention is obtained by allowing the end user and/or the manufacturer of the computer system to set the external pointers to either the shared or private region. For instance, if all unresolved pointers are assigned to private memory, this enables a registered EPF to call ordinary EPFs and shared programs. An EPF that is being registered would not be restricted to calling other registered EPFs but can call non registered EPFs and shared programs. This situation yields programming ease because the user does not have to be concerned about the type of executable programs the registered EPF is calling.

Alternately, the end user could set all unresolved pointers to shared memory space This situation would yield high performance, however, all external pointers must reference only other registered EPFs or shared entry points in the operating system. Finally, the sophisticated user can specify which unresolved pointers are to be private and which are to be shared to provide the maximum performance.

FIG. 1 shows a block diagram of the registered database 12 of the present invention. The database comprises a series of various tables. Table 14 is a hash table. The names of all the registered EPFs are hashed into this table for quick access. Each entry in the hash table points to a list of name block structures. There is a name-block structure for each registered EPF. If two or more registered EPFs are hashed to the same value, then their name block structures are linked together. The hash table 14 points to one of the libraries 16 in the database. Each library 16 in the database contains information relevant to one of the EPFs, which information is contained in various blocks (e.g., blocks 17, 18 and 20). Each library includes a name block 18 identifying the name of the EPF and of an extended information table (EIT). Block 21 is a pointer which points to an EIT table 22. The EIT table 22 contains all data about the specified EPF. The data in the EIT table most relevant to the present invention includes the linkage state 24, the invocation state 26, the address of the linkage segments 28, and block 30 indicating whether the linked flag has been set.

Figure 2A:
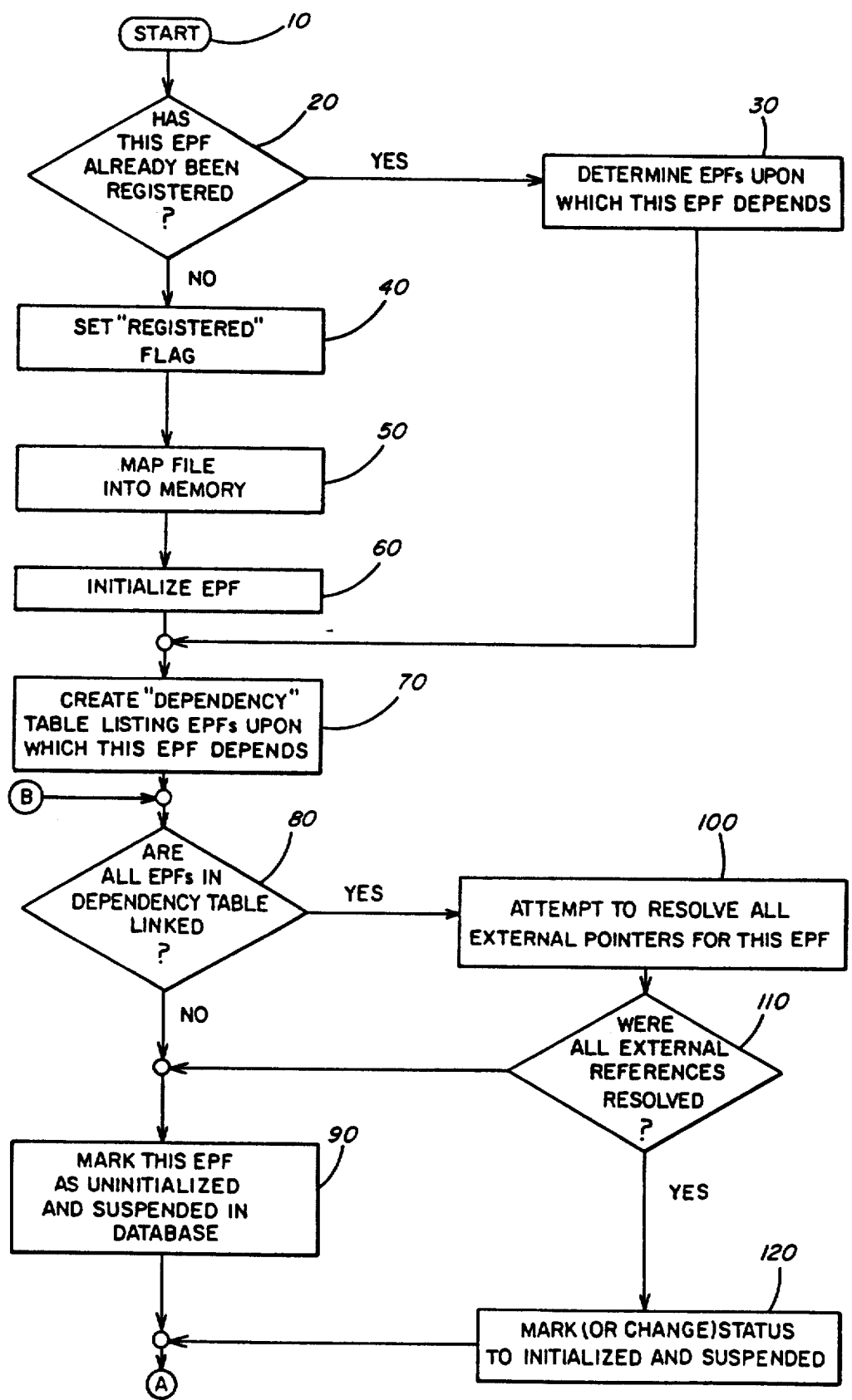
FIG. 2A & 2B are flowchart, showing the steps of the present method.
Figure 2B:
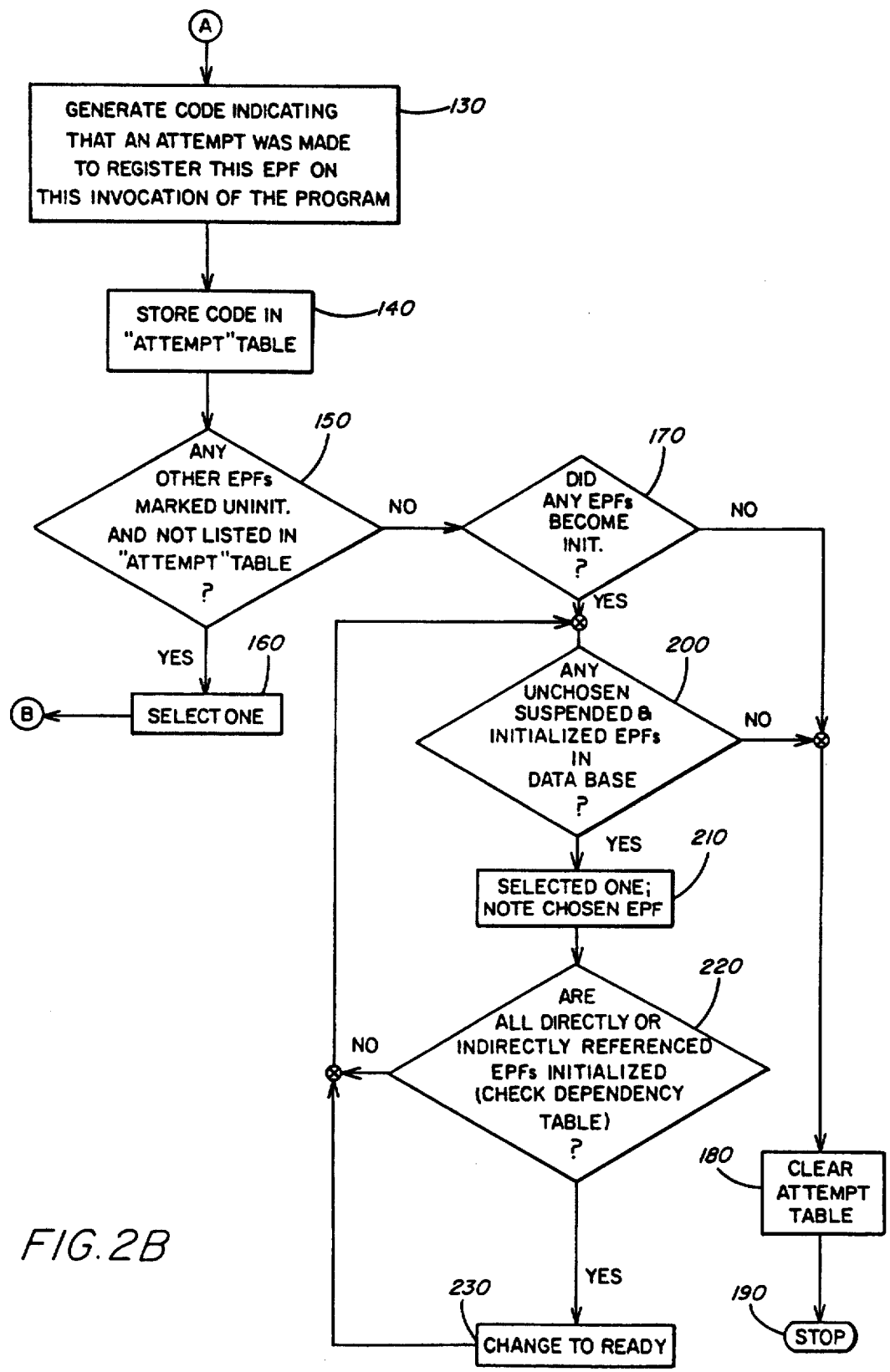

FIG. 2 shows a flow diagram of a preferred embodiment of the method for registering EPFs of the present invention. The flowchart shows a routine for setting one EPF at a time. At registration time, however, the operating system attempts to register all EPFs and, therefore, the actual program embodying the present invention will run through the steps shown in the flowchart of FIG. 2 for each EPF which is to be registered. Therefore, at step 240 (STOP), the program will essentially loop around again to step 30 (START) until all EPFs have been registered. The flowchart in FIG. 2 includes the optional feature discussed above of determining when all other EPF referred to by an EPF are registered and only attempting to change the linkage and invocation status of that EPF when the EPFs upon which it depends are registered.

In step 40, the "registered" flag is set. In step 50, the program then maps the compiled program into memory. In step 60, the EPF is initialized but at this point, no attempt to resolve the pointers is made. In step 70, the program creates a direct dependency table based on the list of EPFs which the user specifies the present EPF to depend upon. The optional direct dependency table can be checked in order to inhibit useless attempts to re-register EPFs which currently cannot become READY. In step 80, the program determines if all of the EPFs listed in the direct dependency table for the instant EPF are registered. This is done by cross referencing the direct dependency table of this EPF with the list of registered EPFs in the database. If less than all of the EPFs in the direct dependency table are registered, programming is directed to 90 where the instant EPF is marked as UNINITIALIZED and SUSPENDED in the database.

If all EPFs in the direct dependency table of the instant EPF are registered, (i.e., the outcome of step 80 is yes) then, in step 100, an attempt is made to resolve all external pointers present in the shared linkage. However, since the user has not necessarily completely listed the EPFs upon which the present EPF depends, the direct dependency table may not be complete. Thus, the fact that all EPFs in the direct dependency table are registered does not guarantee that all external pointers of the present EPF can be resolved.

During the attempt to resolve the external pointers in step 100, a secondary dependency table can be created, which lists the registered EPFs upon which the present EPF depends. The secondary dependency table, however, will not include the unregistered EPFs upon which the EPF depends since that cannot be determined at this point. This secondary dependency table can be used to provide a quick and easy manner for determining which EPFs must have their invocation and linkage states modified when another EPF is unregistered or re-registered.

If the attempt to resolve all external pointers in step 100 is unsuccessful, programming is directed to step 90 where the EPF is marked in the database as UNINITIALIZED and SUSPENDED. If the outcome of the attempt to resolve all the external pointers is successful, step 110 directs programming to step 120 where the EPF is marked as INITIALIZED in the database. At this point, the invocation status of the instant EPF is still undetermined.

The program now re-attempts to register EPFs which were previously registered but were not marked INITIALIZED. However, as shown in step 130, it must first be noted somewhere in memory that an attempt was made to register the instant EPF on this run through the flowchart so that the program knows what EPFs have and have not been run through steps 80-160. In step 140, the attempt code is stored in an Attempt table.

After step 140, the current EPF has been assigned a linkage state and an invocation state. At this point, the program will attempt to update the linkage status of the previously registered EPFs. In step 150, the program determines if any other UNINITIALIZED EPFs exist which are not listed in the Attempt table. If the outcome of step 150 is affirmative, then programming continues on to step 160 where one of the UNINITIALIZED EPFs is chosen and programming is directed back to step 80. Programming will loop around through steps 80-160 until all UNINITIALIZED EPFs are tried and, therefore, listed in the Attempt table. At this point, the outcome of step 150 will be negative sending programming on to step 170.

Step 170 inquires whether any EPFs have become INITIALIZED during this run of the program. If the answer in "no", then there is no possibility of updating the invocation status of any EPFs and programming is directed towards step 230. In step 230, the Attempt table is cleared so that it is ready for the next run through the flowchart steps. The program is stopped at step 240. If, however, one or more EPFs became initialized, then programming is sent to step 180. Step 200 inquires whether there are any SUSPENDED EPFs in the database. If the answer is "no", then no EPFs can have their invocation status updated and, therefore, programming is sent to step 230. If the outcome of step 180 is affirmative, then, in step 190, one of the suspended EPFs is selected. In a preferred embodiment, the first EPF chosen is the original EPF for which this run of the program was initiated (referred to above as the "instant EPF"). In step 200, the programming takes note of which EPFs was chosen in step 190 so that it does not attempt to update the invocation status of any given EPF more than once per run through the steps of the flowchart. In step 210, the program determines if the invocation status of the selected EPF can be changed from SUSPENDED to READY. This involves several steps as described above. First, the database is checked to see if the SUSPENDED EPF is INITIALIZED. If not INITIALIZED, then it cannot possibly be READY. If INITIALIZED, then the dependency table is cross-referenced with the database table to determine if all EPFs upon which it depends directly or indirectly are INITIALIZED. If they are, the invocation status of the selected EPF is changed to READY. If not, step 220 is skipped and programming is returned to step 200. The looping through steps 180-220 will continue until all suspended EPFs are checked. At that time, step 180 will advance programming to step 230 where the Attempt table is cleared as described above.

Having thus described one particular embodiment of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method of registering Executable Program Formats (EPFs) in a list of EPFs in a computer system, said EPFs having unresolved pointers to shared memory space, which shared memory space can be accessed by all EPFs;
    sequentially registering each EPF, said registration including resolving an actual address in said shared memory space of all of the unresolved pointers to said shared memory space for which an actual address is determinable,
    after each registration of an EPF from said list, if said EPF still has at least one unresolved pointer to shared memory space or said EPF references another EPF which is unregistered or has at least one unresolved pointer to shared memory space, storing data identifying said EPF in a database comprising the sub-steps of:
    storing in said database a linkage state for each EPF, said linkage state being INITIALIZED if all pointers to shared memory space are resolved and being UNINITIALIZED otherwise.
    storing in said database a SUSPENDED invocation state for each said EPF which SUSPENDED invocation state indicates that at least one pointer to shared memory space is unresolved or at least one of the EPFs referenced by a pointer in said EPF is UNINITIATED or not registered and,
    after registration of each EPF, resolving an actual address in shared memory space of all of the unresolved pointers of each EPF listed in said database for which an actual address is determinable and updating said invocation state and linkage state of each of said EPFs.

2. A method as set forth in claim 1 wherein, after all remaining unresolved pointers of an EPF are resolved, and all EPFs which said EPF references are READY, the linkage state of said EPF is made INITIALIZED and the invocation state of said EPF is made READY.

3. A method as set forth in claim 2 wherein data defining the unresolved pointers of each EPF is stored in memory.

4. A method as set forth in claim 3 further comprising the steps of:
    creating a direct dependency table for each SUSPENDED EPF which table lists those EPFs to which said SUSPENDED EPF refers,
    after each EPF is registered, comparing a list of READY EPFs with said direct dependency table for said registered EPF, and
    resolving an actual address in said shared memory space for the unresolved pointers for which an actual address is determinable of only the suspended EPFs for which the EPFs listed in the related portion of the dependency table are all READY.

5. A method as set forth in claim 4 further comprising the step of:
    unregistering the first copy of a registered EPF, through an unregister instruction, before re-registering said first registered EPF, such that a second copy of the EPF is generated in shared memory space.

* * * * *